United States Patent [19]

Vandevier

[11] Patent Number: 4,928,771
[45] Date of Patent: May 29, 1990

[54] CABLE SUSPENDED PUMPING SYSTEM

[75] Inventor: Joseph E. Vandevier, Claremore, Okla.

[73] Assignee: Baker Hughes Incorporated, Houston, Tex.

[21] Appl. No.: 385,208

[22] Filed: Jul. 25, 1989

[51] Int. Cl.$^5$ ............................................. E21B 43/00
[52] U.S. Cl. .................................. 166/385; 166/65.1; 166/66.4; 166/68; 166/106; 417/423.3
[58] Field of Search ...................... 166/65.1, 66.4, 68, 166/72, 105, 106, 113, 369, 370, 385, 381; 417/423.3, 423.15

[56] References Cited

U.S. PATENT DOCUMENTS

| | | | |
|---|---|---|---|
| 2,310,757 | 2/1943 | Wagner | 166/65.1 |
| 2,940,395 | 6/1960 | Hill | 166/66.4 |
| 3,411,454 | 11/1968 | Arutunoff | 417/423.3 |
| 3,568,771 | 3/1971 | Vincent | 166/66.4 |
| 3,638,732 | 2/1972 | Huntsinger et al. | |
| 3,672,795 | 6/1972 | Arutunoff et al. | 417/423.3 |
| 3,835,929 | 9/1974 | Suman, Jr. | 166/66.4 |
| 3,853,430 | 12/1974 | O'Rourke | 417/423.3 |
| 4,171,934 | 10/1979 | Zehren . | |
| 4,352,394 | 10/1982 | Zehren . | |
| 4,440,221 | 4/1984 | Taylor et al. . | |
| 4,444,255 | 4/1984 | Geoffrey et al. | 166/65.1 |
| 4,453,892 | 6/1984 | Brookbank, III . | |
| 4,476,923 | 10/1984 | Walling . | |
| 4,553,590 | 11/1985 | Phillips . | |
| 4,621,689 | 11/1986 | Brookbank, III . | |
| 4,662,437 | 5/1987 | Renfro . | |
| 4,681,169 | 7/1987 | Brookbank, III . | |
| 4,716,960 | 1/1988 | Eastlund et al. | 166/65.1 |

OTHER PUBLICATIONS

Hertz, Claude M., Current Techniques in Phase Conversion Systems, May 1-2, 1978.
Production Technologies International, Inc., Stop Paraffin Build-Up and Realize Your Well's Full Potential, 1987.

Primary Examiner—Bruce M. Kisliuk
Attorney, Agent, or Firm—James E. Bradley

[57] ABSTRACT

A centrifugal pump is lowered into a well and retrieved from the well by means of its power cable. The power cable has a single conductor. The pump has a downhole electrical motor which is three-phase. Single-phase AC power will be supplied from the surface down the conductor, with the return being the casing. A phase converter converts the single-phase AC power to three-phase AC power downhole for driving the pump motor.

5 Claims, 1 Drawing Sheet

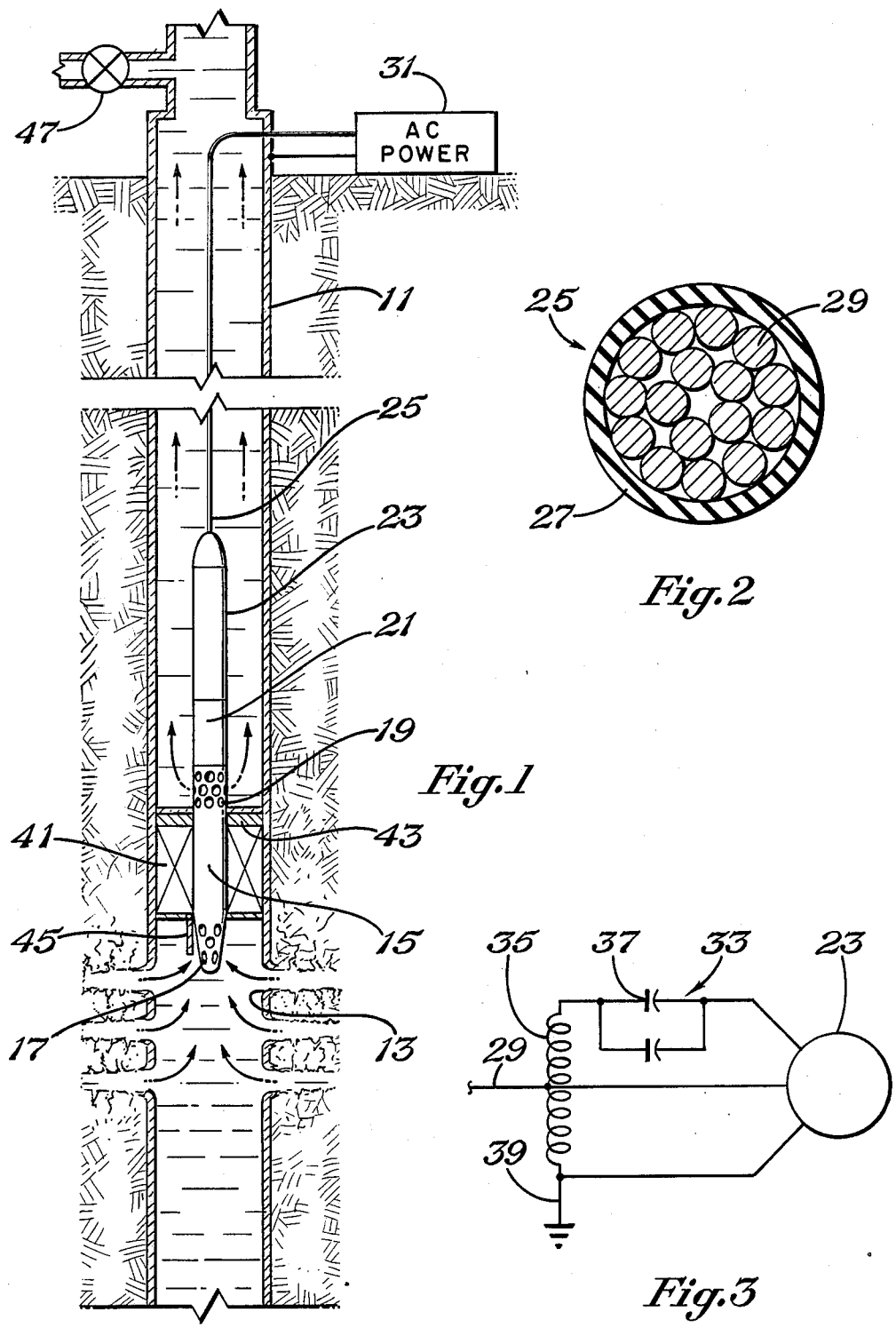

CABLE SUSPENDED PUMPING SYSTEM

BACKGROUND OF THE INVENTION

1. Field of the Invention:

This invention relates in general to electrical submersible pumps and in particular to an electrical submersible pump that is suspended on conductor cable.

2. Description of the Prior Art:

Large electrical submersible pumps are commonly used to pump wells that are of considerable depth and which require large flow rates. The pump will have a submersible three-phase alternating current (AC) electrical motor. The pump will be of a centrifugal type, having a large number of stages. The pump is lowered on tubing into the cased well or into a liner within the cased well. Power to the motor will be supplied from the surface over a three-phase cable having three conductors. The formation fluid will be pumped through the tubing to the surface.

Periodically, the downhole pumping assembly must be pulled to the surface for maintenance. A workover rig will be needed to pull the tubing and pump assembly from the well. The tubing typically comprises steel pipe sections screwed together. Pulling a pump is time-consuming and expensive. It is particularly a problem for remote wells and offshore wells where the availability of pulling rigs is limited.

Suspending the pumping assembly on a cable has been proposed. In such a case, the pump pumps the formation fluid through the casing or liner to the surface. For maintenance, the pump can be retrieved by a winch which will winch the cable up, eliminating the need for a workover rig.

Cable suspended systems proposed in the past require a specially constructed cable because the conventional three-phase power cable lacks sufficient tensile strength to support the weight of the pump assembly. The cable proposed in the past has structural supporting members, as well as three conductors. Some of the cables proposed had major technical difficulties because of the complexity of the cable construction, difficulty in splicing, and the tendency of the cable to rupture under gas depressurization. Early efforts resulted in failures and abandonment. More recent suspended cables proposed have an even more complex cable utilizing molded vertebrate While this may be feasible, the cost of the cable will be high.

SUMMARY OF THE INVENTION

In this invention, a single conductor cable is used. The single conductor will have a large enough diameter to support the weight of the downhole pump assembly.

Single-phase AC power will be supplied from the surface down the single conductor. A phase converter will be located downhole at the pump motor. The phase converter converts the single-phase AC power to three-phase AC power. The return for the single-phase AC power will be the casing. The three-phase AC power powers the motor for driving the pump.

BRIEF DESCRIPTION OF THE DRAWINGS

FIG. 1 is a schematic sectional view illustrating a submersible pump system constructed in accordance with this invention.

FIG. 2 is a cross-sectional view of the cable used with the pump system of FIG. 1.

FIG. 3 is a schematic of the phase converter used with the pump system of FIG. 1.

DETAILED DESCRIPTION OF THE INVENTION

Referring to FIG. 1, the well will have a metal liner or casing 11. Perforations 13 provide means for formation fluids to flow into the casing 11. A submersible, centrifugal pump 15 will be located in the casing 11 above the perforations 13. Pump 15 is a conventional pump, having a plurality of stages of impellers and diffusers. Pump 15 has an intake 17 on its lower end and a discharge 19 on its upper end.

A seal section 21 mounts to the upper end of the pump 15. An electrical motor 23 connects to the upper end of the seal section 21. The seal section 21 seals the connection between the pump 15 and motor 23. The seal section 21 also has pressure balancing means for equalizing the pressure within the motor 23 with the fluid pressure on the exterior. Motor 23 is a conventional three-phase induction electrical motor. It has a stationary stator containing three-phase windings and a rotating central rotor.

A cable 25 extends from the electrical motor 23 to the surface. Cable 25, as shown in FIG. 2, has an insulating layer 27 surrounding a single conductor 29. Conductor 29 is made up of a plurality of individual wires or strands in electrical continuity with each other. For the purposes herein, "single conductor" refers to a cable wherein all of the wires within in the cable are in electrical continuity with each other, even through each wire is a conductor. In a three-phase power cable, the three conductors are electrically insulated from each other. The conductor 29 will be sized to have sufficient tensile strength to support the weight of pump 15 and motor 23.

A power source 31 will be located at the surface. The power source 31 typically includes a transformer which receives power from utility lines. The power source 31 supplies single-phase AC power down the conductor 29. The power will be applied between the conductor 29 and the casing 11, which serves as an electrical return or ground.

A phase converter 33 will be located with the downhole assembly, preferably in the housing for the motor 23. Phase converter 33 is illustrated in FIG. 3. It includes a transformer 35. The conductor 29 will be connected to a center tap of the transformer 35. One leg of the transformer 35 leads to one or more capacitors 37 in parallel. The opposite side of the capacitors 37 leads to the motor 23. The other leg of the transformer 35 will be connected to a ground 39, such as the housing of motor 23. Ground 39 will be in electrical contact with the casing 11.

The pump 15 lands in a packer 41 which has been set downhole in the casing. Packer 41 may be of a conventional type and serves as means for supporting the pump 15 once the pump seats in the packer 41. It has an axial passage for receiving the pump 15. The packer 41 may be set downhole prior to lowering the pump 15 and motor 23 in place. The packer 41 will have a flapper valve 45 on its lower end, which closes when the pump 15 is pulled upward relative to the packer 41. The intake 17 of pump 15 locates below the packer 41, and the discharge 19 locates above the packer 41. Packer 41 thus also serves as means for isolating the intake 17 from the discharge 19 to enable fluid to be pumped up the casing 11.

Packer 41 has a conductive path means, illustrated schematically by numeral 43, for electrically connecting the ground 39 of the phase converter 33 to the casing 11. The conductive path 43 includes the conventional metal slips and associated structure used in the packer 41. The metal slips will be in electrical continuity with the housing of the pump 15 and housing of the motor 23 once the pump 15 lands in the packer 41. The conductive path 43 thus grounds the housing of motor 23 to the casing 11.

The casing 11 will have a flow control 47 at its upper end which will include a choke or valve. In operation, packer 41 will be set in place at the proper depth above the perforations 13. The pump 15, seal section 21, and motor 23 will be assembled at the surface and connected to cable 25. A winch (not shown) will be used to lower the cable 25 into the well. The pump 15 will enter the passage in the packer 41, open the valve 45 and seat within the packer 41. Conductive path 43 between the phase converter 33 and the casing 11 will be established once the pump 15 has seated in the packer 41.

Then, single-phase AC power will be supplied from the power source 31. The power will be delivered down the conductor 29, with the return being the casing 11. The downhole phase converter 33 will convert the single-phase power to three-phase power. The three-phase power is supplied to the motor 23. The motor 23 rotates the impellers within the pump 15. Pump 15 draws formation fluid in the intake 17 and discharges it out the discharge 19. The fluid flows up the casing out the flow control 47.

The invention has significant advantages. The pump is lowered into and retrieved from the well on a cable. This removes the need for tubing. This allows a winch to be used to install and retrieve the pump, rather than requiring a workover rig. The cable is simple in construction, having only a single large conductor. The conductor may be constructed with sufficient strength to support the pump and motor. The cost should be substantially no more than the conventional cable used for submersible pumps which are tubing suspended.

While the invention has been shown in only one of its forms, it should be apparent to those skilled in the art that it is not so limited, but is susceptible to various changes without departing from the scope of the invention.

I claim:

1. In a well having casing containing formation fluid, an improved means for pumping the fluid to the surface, comprising in combination:
   a centrifugal pump located within the well;
   a submersible three-phase electrical motor located within the well and coupled to the pump for driving the pump;
   a cable having a conductor, the cable having a lower end connected to the motor and an upper end extending to the surface, the cable having sufficient strength to support the weight of the pump and motor, allowing the pump and motor to be lowered into and retrieved from the well on the cable;
   means for supplying single-phase AC power from the surface down the conductor; and
   means located at the lower end of the cable for converting the single-phase AC power to three-phase electrical power to power the motor.

2. In a well having casing containing formation fluid, an improved means for pumping the fluid to the surface, comprising in combination:
   a centrifugal pump located within the well;
   a submersible three-phase electrical motor located within the well and coupled to the pump for driving the pump;
   a cable having a conductor, the cable having a lower end connected to the motor and an upper end extending to the surface, the cable having sufficient strength to support the weight of the pump and motor, allowing the pump and motor to be lowered into and retrieved from the well on the cable;
   means for supplying single-phase AC power from the surface down the conductor with the casing serving as an electrical return;
   phase converter means located at the lower end of the cable for converting the single-phase AC power to three-phase electrical power to power the motor; and
   means for providing a conductive path from the phase converter means to the casing to enable the casing to serve as the electrical return for the single-phase AC power.

3. In a well having casing containing formation fluid, an improved means for pumping the formation fluid to the surface, comprising in combination:
   a packer set in the well;
   a centrifugal pump supported on the packer, the pump having an intake located below the packer for receiving the formation fluid and a discharge located above the packer for discharging the formation fluid into the casing to flow through the casing to the surface;
   a submersible three-phase electrical motor located within the well and coupled to the pump for driving the pump;
   a cable having only a single electrical conductor, the cable having a lower end connected to the motor and an upper end extending to the surface, the cable being insulated and having sufficient tensile strength to lower and retrieve the pump and motor from the well;
   means for supplying single-phase AC power from the surface between the conductor and the casing;
   phase converter means located at the lower end of the cable for converting the single-phase AC power to three-phase electrical power to power the motor; and
   means for providing a conductive path from the phase converter means to the casing to enable the casing to serve as a return for the single-phase AC power.

4. An improved method for pumping fluid from a well having a casing to the surface, comprising in combination:
   lowering into the well on an electrical conductor cable a three-phase electrical motor and centrifugal pump assembly;
   providing single-phase electrical power down the cable; and
   converting at said assembly the single-phase electrical power to three-phase electrical power and powering the motor with the three-phase electrical power, causing the pump to rotate and pump the fluid to the surface.

5. An improved method for pumping fluid from a well having a casing to the surface, comprising in combination:

connecting an electrical single conductor cable to a three-phase electrical motor and centrifugal pump assembly;

supporting the weight of said assembly with the cable and lowering said assembly into the well with the cable;

supporting said assembly in the well on a packer with a pump intake located below the packer and a pump discharge located above the packer;

providing single-phase electrical power between the cable and the casing; and converting at said assembly the single-phase electrical power to three-phase electrical power and powering the motor with the three-phase electrical power, causing the pump to rotate and pump the fluid out the pump discharge into the casing to flow through the casing to the surface.

* * * * *